United States Patent Office 3,649,595
Patented Mar. 14, 1972

3,649,595
HEAT STABILIZERS FOR POLYAMIDES
Richard H. Kline, Cuyahoga Falls, Ohio, assignor to The Goodyear Tire & Rubber Company, Akron, Ohio
No Drawing. Filed Oct. 14, 1968, Ser. No. 767,460
Int. Cl. C08g 51/58
U.S. Cl. 260—45.95
6 Claims

ABSTRACT OF THE DISCLOSURE

A compound for stabilizing macromolecular synthetic linear polyamides against tensile degradation at elevated temperatures which comprises a bisphenol disulfide having the general formula

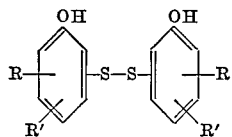

in which R and R' are members selected from the group consisting of hydrogen and alkyl groups containing from one to eight carbon atoms.

---

This invention relates to the stabilization of synthetic linear polyamides and particularly to the stabilization of synthetic linear polyamides against tensile degradation developed at elevated temperatures when the polyamides are serving as a reinforcement for a rubbery material.

When exposed to elevated temperatures, synthetic linear polyamides undergo degradation which impairs the tensile strength that makes such compounds particularly desirable as a reinforcing element in the construction of, for example, a pneumatic tire. This loss in tensile strength materially affects the utility of rubbery articles containing the polyamide, particularly rubber coated fabrics, and pneumatic tires where much dependence is placed upon maximum retention of toughness and tensile during service.

In U.S. Pat. 3,086,960, assigned to the assignee of the present invention, it was discovered that incorporation of a small amount of a sulfide of a dialkylated phenol with polyamides provides improvement in retention of the tensile strength, particularly at elevated temperatures.

It is an object of the present invention to provide other compounds capable of improving the retention of tensile strength in synthetic linear polyamides, especially at elevated temperatures. Other objects will be come apparent from the following description.

The objects of the present invention are accomplished by incorporating in or applying to the surface of a synthetic linear polyamide a small amount of the bisphenol disulfides having the folowing general structural formula:

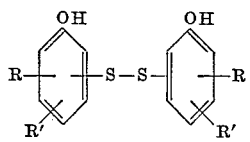

in which R and R' are hydrogen and alkyl groups containing from one to eight carbon atoms. It is preferred to have at least one of the R's be hydrogen or methyl. Particularly advantageous compounds are provided when R and R' are hydrogen, R is 2-methyl and R' is 4-tert. butyl, R is 3-methyl and R' is 6-tert. butyl, R' is tert. butyl and R is a mixture of 2, 3 and 4 methyl and R' is tert. butyl and R is a mixture of 3 and 4 methyl. If desired, either or both of the R and R' groups could be pentyl, hexyl, heptyl or octyl. Generally, these bisphenol disulfides should be present in a amount from about 0.1% to about 2% by weight, based upon the weight of the polyamide.

The synthetic linear polyamides with which the present invention is effective are of the nylon type, i.e.—macromolecular polyamides that are prepared from polymerizable monoamino-carboxylic acids or their amide-forming derivatives or from amide forming derivatives of these compounds. Preparation and use of these polymers are illustrated in U.S. Pats. 2,071,250; 2,071,253 and 2,130,-948. In general, the polyamides have intrinsic viscosity above 0.4 with the tests for intrinsic viscosity being carried out as set forth in U.S. Pat. 2,130,948.

To incorporate the bisphenol disulfides of the present invention into the polyamide, the sulfides may be applied to the nylon yarn by immersing the yarn in an acetone solution of the sulfide or the sulfide may be applied to the cord after the yarn has been twisted into a cord. Also, the sulfides could be added to conventional adhesives that are applied to the nylon cord prior to being embedded in a rubbery material. In addition to using acetone, any other suitable organic solvent may similarly be used. The sulfide stabilizers of the present invention may also be applied to the surface of the nylon in either yarn or cord form by adding a water suspension of the sulfides to a latex adhesive system. A still further method of incorporating sulfide into the nylon involves placing the sulfides in the nylon melt prior to spinning into a fiber.

The nylon cord stabilized in accordance with the present invention may be used to reinforce any rubbery material for uses such as, for example, a pneumatic tire or other similar pneumatic structure. These rubbery materials include natural rubber and the synthetic rubbers such as the rubbery copolymers of butadiene and styrene and the rubbery copolymers of butadiene and acrylonitrile and the rubbery copolymers of butadiene and vinyl pyridine and polymers of butadiene-1,3, isoprene, 2-chloro butadiene-1,3, and isobutylene as well as interpolymers of these and similar materials with each other or with other polymerizable monomers such as methacrylonitrile, methyl methacrylate, ethyl methacrylate, 2-vinyl pyridine, and similar monomeric materials.

The compounds of the present invention may be formed by reacting sulfur monochloride ($S_2Cl_2$) with phenol or a substituted phenol at moderate temperatures. Rather than utilizing a single material, a mixture could be employed as the phenol reactant. For example, cresol that is commercially available is often a mixture of ortho, para and meta or of meta and para.

The sulfur monochloride may be added to the phenol or substituted phenol reactant, desirably present in an inert solvent such as carbon tetrachloride, hexane or benzene, with the temperature during the addition being maintained in the range of from about 0 to 70° C., 25 to 50° C. being preferred. The mole ratio of the monochloride to the phenol reactant should be maintained between about 0.5:1 to 1:1 with a range of from 0.5:1 to 0.6:1 being preferred. While the phenol reactant need not be present in an inert solvent if the reactant is a liquid or has a low melting point, the use of an inert solvent is preferred.

The reaction mixture formed by the sulfur monochloride and the phenol reactant is then maintained at a temperature in the range of from about 25 to 200° C., with 70 to 100° C. being preferred. The reaction is allowed to continue until all of the hydrochloric acid being formed is expelled. The resulting product will, of course, be a mixture of compounds with the disulfide bridge connecting the phenol groups para-para or ortho-para or ortho-ortho.

EXAMPLE 1

A solution of 74.3 grams of sulfur monochloride in 100 cc. of carbon tetrachloride was added in two hours fifteen minutes at 25 to 35° C. to a solution of 94 grams of phenol in 50 cc. of carbon tetrachloride. The reaction mixture was heated under reflux for one hour. The solvent and unreacted phenol were removed by heating under vacuum. The residue, bisphenol disulfide, a brown waxy solid, weighed 124 grams.

EXAMPLE 2

A solution of 45.5 grams of sulfur monochloride in 100 cc. of carbon tetrachloride was added in three hours at 40 to 45° C. to a solution of 100 grams of tert. butyl-o-cresol and 50 cc. of carbon tetrachloride. The reaction mixture was heated under reflux for 45 minutes. It was then heated under vacuum to remove the solvent and the unreacted starting materials. A yield of 95.5 grams of a dark resinous product, 2,2'-dithiobis(4-tert. butyl-6-methyl phenol) was obtained.

EXAMPLE 3

An unstabilized type 6 (homopolymer of caprolactam) 1680 denier nylon cord made by twisting two 840 denier cables of nylon yarn and having a tensile strength of 27.1 pounds was aged at 400° F. in an oven. During the aging the nylon cord was stretched by means of a 200 gram weight attached to the lower end thereof. After an aging period of 30 minutes, the cord was found to have broken in the oven indicating that the tensile strength had completely deetriorated. The 200 gram load represented the tensile pull necessary to permit the cord to return to its original length after cooling to room temperature.

EXAMPLE 4

Separate portions of the nylon cord used in Example 3 were treated by dipping in 5% acetone solutions of certain representative examples of the bisphenol disulfides of the present invention formed by the general method described in Examples 1 and 2. The cords were dried in air at room temperature. Samples of each of the treated cords were then aged as described in connection with Example 3. The tensile strengths of the treated cords were as follows:

TABLE

| Reaction product of sulfur monochloride | Tensile strength of cord heat aged at 400° F. | |
|---|---|---|
| | 30 minutes | 60 minutes* |
| Phenol | 21.0 | 19.9 |
| Mixture of meta and para-cresol | 19.0 | 19.6 |
| Butyl-o-cresol | 21.6 | 20.7 |
| Mixture of t-butyl-ortho, meta and para-cresol | 21.7 | 15.6 |
| t-Butyl-m-cresol | 20.4 | 19.3 |
| Mixture of t-butyl meta and para-cresol | 21.5 | 18.7 |
| t-Butyl-p-cresol | 16.4 | |
| t-Amyl-p-cresol | 10.6 | |
| 2,6-di t-butylphenol | 6.6 | |
| 2,4-di t-butylphenol | 7.8 | |

*No figure indicates that the cord broke in the oven, the tensile strength having been completely deteriorated.

Thus, as has been seen, the bisphenol disufides of the present invention provide superior retention of the tensile strength where the polyamides with which the compounds are used are exposed to elevated temperatures where degradation will normally occur. And, while certain representative embodiments and details have been shown for the purpose of illustrating the invention, it should be apparent to those skilled in the art that various changes and modifications may be made therein without departing from the spirit and scope of the present invention.

I claim as my invention:

1. A composition of matter comprising a macromolecular synthetic linear polyamide and a heat stabilizing amount of at least one bisphenol disulfide having the general formula

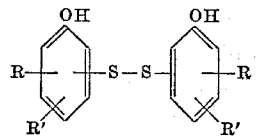

in which R and R' are members selected from the group consisting of hydrogen and alkyl groups containing from one to eight carbon atoms.

2. The composition of claim 1 wherein R and R' are hydrogen.

3. The composition of claim 1 wherein R is 2-methyl and R' is 4-tert. butyl.

4. The composition of claim 1 wherein R is 3-methyl and R' is 6-tert. butyl.

5. A composition comprising a macromolecular synthetic linear polyamide and a heat stabilizing amount of a mixture of three bisphenol disulfides having the general formula:

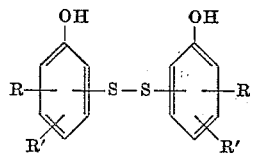

in which the R and R' groups, respectively, for each of the three bisphenol disulfides are tert. butyl and 2-methyl, tert. butyl and 3-methyl and tert. butyl and 4-methyl.

6. A composition comprising a macromolecular synthetic linear polyamide and a heat stabilizing amount of a mixture of two bisphenol disulfides having the general formula:

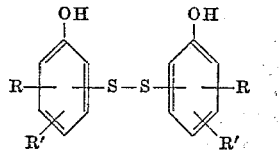

in which the R and R' groups, respectively, for each of the two bisphenol disulfides are tert. butyl and 3-methyl and tert. butyl and 4-methyl.

References Cited

UNITED STATES PATENTS

| | | | |
|---|---|---|---|
| 2,581,919 | 1/1952 | Albert | 210—45.95 |
| 3,168,480 | 2/1965 | Worrel | 260—45.95 |
| 3,173,980 | 3/1965 | Salyer et al. | 260—45.95 |

DONALD E. CZAJA, Primary Examiner

M. J. WELSH, Assistant Examiner

U.S. Cl. X.R.

260—619 B